United States Patent
Fischer

(10) Patent No.: US 9,822,836 B2
(45) Date of Patent: Nov. 21, 2017

(54) AGRICULTURAL IMPLEMENT

(71) Applicant: CLAAS SAULGAU GMBH, Bad Saulgau (DE)

(72) Inventor: Josef Fischer, Warthausen (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 48 days.

(21) Appl. No.: 15/017,775

(22) Filed: Feb. 8, 2016

(65) Prior Publication Data

US 2016/0227706 A1    Aug. 11, 2016

(30) Foreign Application Priority Data

Feb. 11, 2015 (DE) ........................ 10 2015 101 933

(51) Int. Cl.
| | |
|---|---|
| *A01D 34/03* | (2006.01) |
| *F16F 3/12* | (2006.01) |
| *A01B 73/04* | (2006.01) |
| *A01D 34/82* | (2006.01) |
| *A01D 43/08* | (2006.01) |
| *A01D 41/14* | (2006.01) |
| *F16F 1/373* | (2006.01) |

(52) U.S. Cl.
CPC .............. *F16F 3/12* (2013.01); *A01B 73/044* (2013.01); *A01D 34/82* (2013.01); *A01D 41/144* (2013.01); *A01D 43/082* (2013.01); *F16F 1/373* (2013.01)

(58) Field of Classification Search
CPC ... A01B 73/062; A01B 73/067; A01B 73/044; A01B 73/046; A01D 34/661; A01D 75/30; A01D 75/185; A01D 34/82; A01D 43/082; A01D 41/144; A01D 73/067; B62D 49/065; B62D 53/02; B65G 69/008; E02B 3/26; F16F 13/007; F16F 15/046; F16F 3/12; F16F 1/373
USPC .......... 56/1, 6, 7, 10.4, 16.2, 228, 15.9, 153; 172/269, 311, 581, 595; 188/268, 371, 188/377; 267/139; 280/656
See application file for complete search history.

(56) References Cited

U.S. PATENT DOCUMENTS

| | | | | |
|---|---|---|---|---|
| 3,828,715 A | * | 8/1974 | Matsushita | ............... E02B 3/26 114/219 |
| 4,056,149 A | * | 11/1977 | Honnold | .............. A01B 73/067 172/311 |
| 4,066,274 A | * | 1/1978 | Adee | .................... A01B 73/062 172/311 |

(Continued)

FOREIGN PATENT DOCUMENTS

| | | |
|---|---|---|
| EP | 1464214 | 10/2004 |
| EP | 2111740 | 10/2009 |

*Primary Examiner* — Robert Pezzuto
(74) *Attorney, Agent, or Firm* — Michael J. Striker; Elizabeth C. Richter

(57) ABSTRACT

An agricultural implement includes a first central implement section. At least one second implement section is positioned on each of two sides of the first implement section. Adjacent implement sections are each displaceable relative to one another about a pivot axis in order to displace the implement between a transport position and a working position. Each implement section comprises mowing mechanisms, conveying mechanisms or both. A hat-like conveying element made from an elastically deformable material is positioned on at least one of the mowing mechanisms, on at least one of the conveying mechanisms or both.

20 Claims, 3 Drawing Sheets

(56) References Cited

U.S. PATENT DOCUMENTS

| | | | | |
|---|---|---|---|---|
| 4,088,346 A | * | 5/1978 | Schreiner | A01B 73/067 172/311 |
| 4,098,347 A | * | 7/1978 | Honnold | A01B 73/067 172/311 |
| 4,370,846 A | * | 2/1983 | Arnold | A01D 75/30 56/16.2 |
| 4,854,112 A | * | 8/1989 | Holley | A01D 75/30 172/269 |
| 4,856,626 A | * | 8/1989 | Nakanishi | F16F 3/08 188/268 |
| 7,043,889 B2 | | 5/2006 | Rauch | |
| 2007/0151819 A1 | * | 7/2007 | Schmidt | B65G 69/008 188/377 |
| 2014/0312541 A1 | * | 10/2014 | Metz | B65G 69/001 267/139 |

\* cited by examiner

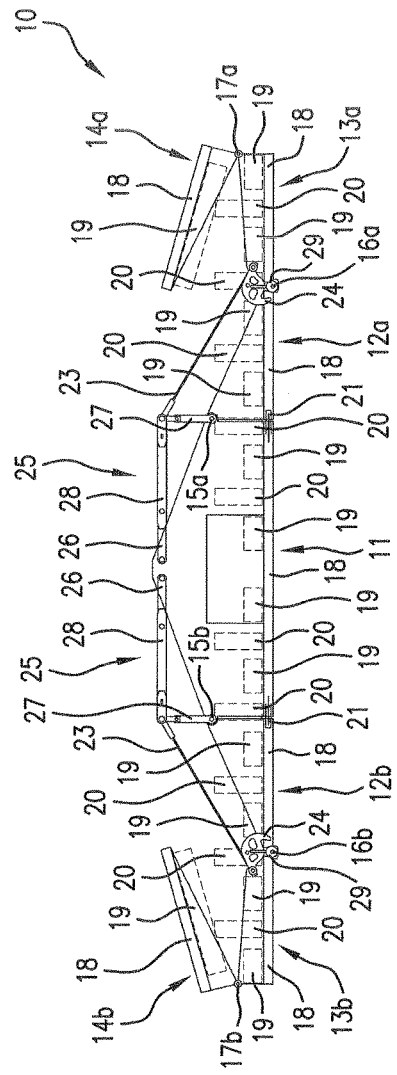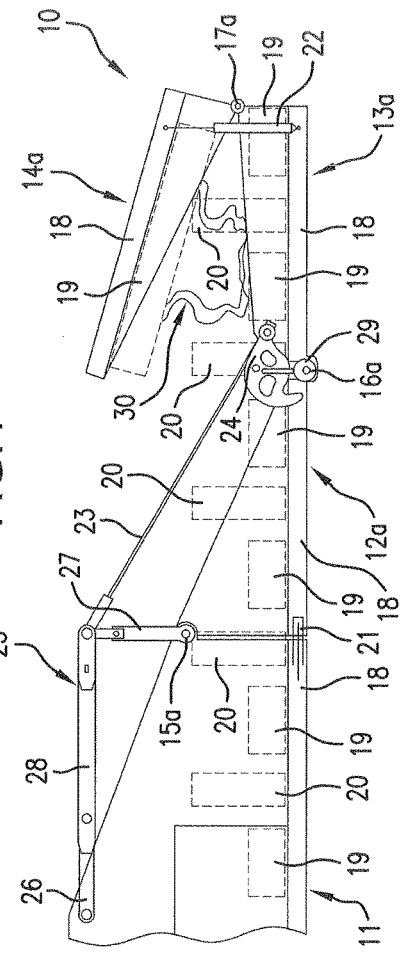

AGRICULTURAL IMPLEMENT

CROSS-REFERENCE TO A RELATED APPLICATION

The invention described and claimed hereinbelow is also described in German Patent Application DE 10 2015 101 933.7, filed on Feb. 11, 2015. The German Patent Application, the subject matter of which is incorporated herein by reference, provides the basis for a claim of priority of invention under 35 U.S.C. 119(a)-(d).

BACKGROUND OF THE INVENTION

The present invention relates to an improvement in an agricultural implement such as, for example, a front attachment of an agricultural harvester and to a hat-like conveying element for the improved agricultural implement. For that matter, the invention is not limited to agricultural implements designed as front attachments.

Agricultural implements are known from the prior art to comprise a first, central, and fixed implement section and multiple second implement sections which adjoin the first implement section on both sides thereof. The second implement sections are displaceable relative the first implement section. When the agricultural implement is a front attachment for an agricultural harvester, such as, for example, a maize front attachment for a forage harvester, the central first implement section is also referred to as the central trough and the displaceable second implement sections adjacent thereto are also referred to as arms. The invention is not limited to agricultural implements designed as front attachments. The agricultural implement also can be a tillage device or a haying machine such as, for example, a swather.

EP 1 464 214 B1 makes known a harvester comprising a front attachment which has a central first implement section and two second implement sections on each of the two sides thereof. The inner second implement sections are each displaceable, with respect to the first implement section, about a pivot axis, wherein the outer second implement sections, which adjoin the inner second implement sections opposite the first implement section, are likewise displaceable about pivot axes with respect to the particular inner second implement section. The implement sections of the implement are displaceable with respect to one another between a working position and a transport position in such a way that the second implement sections adjacent to the fixed first implement section extend toward one another, in the transport position, so as to form an obtuse angle or in the manner of a roof.

A further front attachment of an agricultural harvester is known from EP 2 111 740 B1. This front attachment also comprises a first, central, and fixed implement section and second implement sections which adjoin the first implement section on both sides thereof and are each displaceable, specifically in such a way that the inner second implement sections are each displaceable, with respect to the first implement section, about a pivot axis, and the outer second implement sections, which adjoin the particular inner second implement section opposite the first implement section, are each displaceable about a pivot axis relative to the particular inner second implement section. The implement sections are asymmetrically displaceable, specifically in such a way that, in the transport position, all the working implements are disposed in four layers which extend parallel to one another.

It is known from the prior art that each implement section of such an agricultural implement comprises mowing mechanisms and/or conveying mechanisms. Mowing mechanisms are used for cutting and conveying the crop, whereas the conveying mechanisms are used exclusively for conveying crop which already has been cut. In the transport position of the implement, the mowing mechanisms and/or conveying mechanisms of implement sections, which are displaceable relative to one another, must not collide with one another. The dimensions of the mowing mechanisms and/or the conveying mechanisms are therefore limited in order to ensure a compact transport position.

SUMMARY OF THE INVENTION

The present invention overcomes the shortcomings of known arts, such as those mentioned above.

The invention provides an agricultural implement comprising a first central implement section, wherein at least one second implement section is positioned on each of the two sides of the first implement section, wherein adjacent implement sections are each displaceable relative to one another about a pivot axis in order to displace the implement between a transport position and a working position. Each implement section comprises mowing mechanisms and/or conveying mechanisms. A hat-like conveying element made from an elastically deformable material is positioned on at least one of the mowing mechanisms and/or on at least one of the conveying mechanisms of at least one implement section. The hat-like conveying element, which is positioned on a mowing mechanism or a conveying mechanism in each case, improves the conveyance of the crop, which is intended to be cut or has been cut, within the agricultural implement. Given that each hat-like conveying element is formed from an elastically deformable material, it can deform in the transport position in order to thereby ensure a compact transport position of the implement.

According to the invention, the or each hat-like conveying element, which is preferably produced from an elastomeric material, is elastically deformed in the transport position of the implement, wherein, in the working position of the implement, the conveying element automatically returns to its original shape or working shape. This embodiment of the or each hat-like conveying element is particularly advantageous for ensuring a compact transport position and for ensuring effective conveyance of the crop in the working position of the implement.

In one form, the or each hat-like conveying element has a hat brim-like section and a hat crown-like section, wherein the conveying element bears against the particular mowing mechanism or the particular conveying mechanism via the hat brim-like section thereof, and wherein the hat crown-like section of the conveying element is designed in the manner of a bellows. This embodiment of the or each hat-like conveying element is preferable for ensuring that the particular conveying element can be automatically restored to its original shape or working shape.

BRIEF DESCRIPTION OF THE DRAWINGS

Further features and advantages of the invention will become apparent from the description of embodiments that follows, with reference to the attached figures, wherein:

FIG. 1 depicts an agricultural implement of the invention in a form of a front attachment of an agricultural harvester, in a partially folded-in state of the front attachment;

FIG. 2 depicts a section of an agricultural implement in a partially folded-in state of the front attachment;

DETAILED DESCRIPTION OF THE PREFERRED EMBODIMENTS

Figure 3:
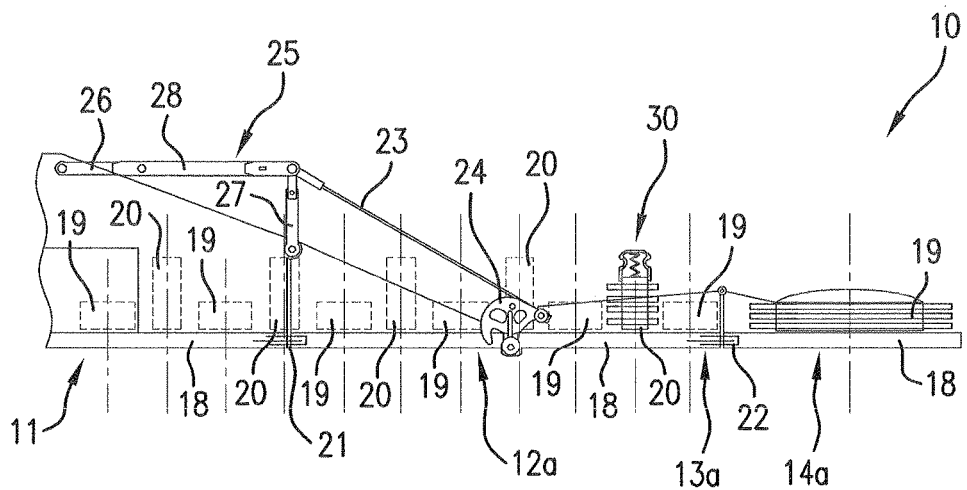
FIG. 3 depicts a section of an agricultural implement of the invention in a form a front attachment of an agricultural harvester, in a completely folded-out state of the front attachment.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

In one example embodiment, the invention is described as a maize front attachment of a forage harvester, but the invention is not limited thereto. A front attachment comprises multiple implement sections, which are referred to in the following as front-attachment sections, specifically a first fixed front-attachment section and, on both sides thereof, second displaceable front-attachment sections. The fixed front-attachment section is typically referred to as a central trough, wherein displaceable second front-attachment sections disposed on both sides of the fixed front-attachment section also are referred to as arms.

FIG. 1 shows a front attachment 10 for an agricultural harvester, constructed in accordance with the invention. As shown, the front attachment 10 includes a first fixed front-attachment section 11, inner second front-attachment sections 12a, 12b, which are adjacent to this first front-attachment section 11 and are displaceable relative to the first front-attachment section 11, central second front-attachment sections 13a, 13b, which are adjacent to the inner second front-attachment sections 12a, 12b opposite the first front-attachment section 11, and outer second front-attachment sections 14a, 14b. The outer second front-attachment sections 14a, 14b are adjacent to the central second front-attachment sections 13a, 13b opposite the respective inner second front-attachment section 12a, 12b.

The inner second front-attachment sections 12a, 12b of the front attachment 10 are each displaceable about a pivot axis 15a, 15b, respectively, relative to the first front-attachment section 11. The central second front-attachment sections 13a, 13b of the front attachment 10 are displaceable about a pivot axis 16a, 16b with respect to the inner second front-attachment section 12a, 12b, respectively. The outer second front-attachment sections 14a, 14b of the front attachment 10 are displaceable about a pivot axis 17a, 17b with respect to the central second front-attachment section 13a, 13b, respectively.

In the exemplary embodiment, in which the front attachment 10 is designed as a maize front attachment, each front-attachment section 11, 12a, 12b, 13a, 13b, 14a, 14b comprises a support element 18, each of which supports at least one mowing mechanism 19, which is driven in a rotating or revolving manner, and/or one conveying mechanism 20. The mowing mechanisms 19 are also referred to as mowing and intake conveyor mechanisms, and the conveying mechanisms 20 are also referred to as cross-conveying mechanisms.

The second front-attachment sections 12a, 13a and 14a, which are positioned on a first side of the central or the first front-attachment section 11 of the front attachment 10, and the second front-attachment sections 12b, 13b and 14b, which are positioned on an opposite, second side of the first front-attachment section 11, comprise support elements 18 for the mowing mechanisms 19 and/or the conveying mechanisms 20, which support elements are symmetrical with respect to the first front-attachment section 11.

The support elements 18 of the second front-attachment sections 12a, 13a, 14a, 12b, 13b, 14b, which are positioned on both sides of the first front-attachment section 11 of the front attachment 10, can be folded symmetrically with respect to the first front-attachment section 11, specifically in such a way that, in the transport position, the front-attachment sections 11, 12a, 13a, 14a, 12b, 13b, 14b of the front attachment 10 are disposed in four layers extending over one another. In the working position, all the support elements 18 of all the front-attachment sections 11, 12a, 13a, 14a, 12b, 13b, 14b are disposed next to one another in one layer.

In the exemplary embodiment, the inner second front-attachment sections 12a, 12b can be pivoted through 180° about the pivot axes 15a, 15b, respectively, relative to the first fixed implement section 11 in order to transfer the implement 10 between the transport position and the working position. The central second front-attachment sections 13a, 13b can each also pivot through 180° about the pivot axes 16a, 16b, respectively, relative to the inner second front-attachment section 12a, 12b, respectively. The outer second front-attachment sections 14a, 14b can each pivot through 150° to 170° relative to the central second front-attachment section 13a, 13b, respectively. As a result, it is ensured that the support elements 18 of the first front-attachment section 11 and of the inner second and central second front-attachment sections 12a, 13a, 12b, 13b extend parallel to one another in the transport position. The support elements 18 of the outer second front-attachment sections 14a, 14b extend toward one another in the transport position so as to form an obtuse angle. As a result, a compact transport position of the front attachment 10 providing a good field of view for a driver of a harvester accommodating the front attachment 10 is achieved.

The support element 18 of the first front-attachment section 11 accommodates four mowing mechanisms 19 and four conveying mechanisms 20. The support elements 18 of the inner second front-attachment sections 12a and 12b each accommodate two mowing mechanisms 19 and one conveying mechanism 20. The support elements 18 of the central second front-attachment sections 13a, 13b each accommodate two mowing mechanisms 19 and two conveying mechanisms 20. The support elements 18 of the outer second front-attachment sections 14a and 14b each accommodate one mowing mechanism 19.

In this case, the mowing mechanisms 19 assigned to the outer second front-attachment sections 14a and 14b have greater diameters than the mowing mechanisms 19 assigned to the other front-attachment sections 11, 12a, 12b, 13a, 13b. The aforementioned number and distribution of the mowing mechanisms 19 and conveying mechanisms 20 on the front-attachment sections 11, 12a, 12b, 13a, 13b, 14a, 14b are provided as examples. For instance, the central trough or the first front-attachment section 11 can also comprise only two mowing mechanisms 20.

In order to move the implement 10 from the folded-out working position into the folded-in transport position, the second front-attachment sections 12a, 13a, 14a, which are positioned on the first side of the first front-attachment section 11, are moved synchronously or simultaneously with the second front-attachment sections 12b, 13b, 14b, which are positioned on the second side of the first front-attachment section 11. According to one possible approach, in the case of a displacement from the working position into the transport position, the outer second implement sections 14a, 14b are displaced first and, subsequent thereto, the inner and the central second implement sections 12a, 13a, 12b, 13b are displaced relative to the first implement section 11. In the reversed displacement from the transport position into the working position, the inner and the central second implement sections 12a, 13a, 12b, 13b are displaced first and, subsequent thereto, the outer second implement sections 14a, 14b are displaced.

The inner second front-attachment sections 12a, 12b can be displaced about the pivot axes 15a, 15b relative to the first front-attachment section 11 with the aid of a displacement device 21 in each case. The outer second front-attachment sections 14a, 14b are displaceable about the pivot axes 17a, 17b relative to the central second front-attachment sections 13a, 13b with the aid of a further displacement device 22 in each case. Each displacement device 21, 22 comprises at least one hydraulic cylinder.

In order to ensure the displaceability of the central second front-attachment section 13a, 13b of the front attachment 10 relative to the inner second front-attachment section 12a, 12b, respectively, of the front attachment 10, the respective central second front-attachment section 13a, 13b of the front attachment 10 is coupled to the first front-attachment section 11 via a tractive force-transmitting element 23, specifically in such a way that, during the displacement of the respective inner second front-attachment section 12a, 12b relative to the first front-attachment section 11 initiated by the respective displacement device 21, the respective central second front-attachment section 13a, 13b is displaceable about the pivot axis 15a, 15b, being forcibly coupled to the displacement of the respective inner second front-attachment section 12a, 12b. The displacement of the respective inner second front-attachment section 12a, 12b of the front attachment 10 and the respective central second front-attachment section 13a, 13b of the front attachment 10 therefore takes place via the respective displacement device 21, which is used for displacing the respective inner second front-attachment section 12a, 12b relative to the first front-attachment section 11, and via the forced coupling of the respective central second front-attachment section 13a, 13b to the first front-attachment section 11 via the respective tractive force-transmitting element 23. The respective tractive force-transmitting element 23 is preferably designed as a rope or, alternatively, as a chain in this case.

The respective tractive force-transmitting element 23 acts via a first end on the first front-attachment section 11 and via an opposite, second end on the respective central second front-attachment section 13a, 13b. The respective central second front-attachment section 13a, 13b comprises a guide element 24 for the respective tractive force-transmitting element 23. The respective guide element 24 is an assembly of the respective central second front-attachment section 13a, 13b. The respective tractive force-transmitting element 23 acts via its second end on the respective guide element 24 of the central second front-attachment section 13a, 13b and is cast therewith, in particular. A section of the tractive force-transmitting element 23, which is adjacent to the second end of the respective tractive force-transmitting element 23, is guided on the respective guide element 24 during the displacement of the respective central second front-attachment section 13a, 13b relative to the respective inner second front-attachment section 12a, 12b in such a way that, during the displacement of the respective central second front-attachment section 13a, 13b relative to the respective inner second front-attachment section 12a, 12b, the respective tractive force-transmitting element 23 is wrapped around the respective guide element 24 more intensively or is unwrapped from the respective guide element 24 more intensively with this section.

If the front attachment 10 is supposed to be transferred from the completely folded-out position in the direction toward the completely folded-in position, when the respective inner second front-attachment section 12a, 12b is folded in relative to the first front-attachment section 11, the respective central second front-attachment section 13a, 13b also is pivoted relative to the inner second front-attachment section 12, being forcibly coupled thereto. During this forcibly-coupled displacement of the respective central second front-attachment section 13a, 13b, the section of the respective tractive force-transmitting element 23 adjacent to the second end of the respective tractive force-transmitting element 23 is wrapped more intensively around the respective guide element 24 for the respective tractive force-transmitting element 23.

In the reversed displacement of the respective central second front-attachment section 13a, 13b relative to the respective inner second front-attachment section 12a, 12b, the respective tractive force-transmitting element 23, specifically the section adjacent to the second end thereof, is unwrapped more intensively from the respectively guide element 24. The respective guide element 24 is rotatably mounted on the respective central second front-attachment section 13a, 13b. A corresponding rotational axis is preferably located adjacent to the second end of the respective tractive force-transmitting element 23. The respective guide element 24 bears against an eccentric 29, which is fixedly connected to the respective inner second front-attachment section 12a, 12b. The respective eccentric 29 moves the respective guide element 24 about its rotational axis back and forth on the respective central second front-attachment section 13a, 13b. The respective eccentric 29 ensures that the respective guide element 24 reduces its spacing from the pivot axis 16a, 16b between the respective inner second front-attachment section 12a, 12b and the respective central second front-attachment section 13a, 13b during the folding-in to such an extent that, when a tractive force-transmitting element 23 designed as a rope is used, a rope vector always has a sufficient lever with respect to the pivot axis 16a, 16b between the respective inner second front-attachment section 12a, 12b and the respective central second front-attachment section 13a, 13b. In the completely folded-out position, the respective eccentric 29 provides a higher position of the respective guide element 24, so that the guide element 24 does not protrude under the agricultural implement and reduce the ground clearance thereof.

In the exemplary embodiment shown, the respective tractive force-transmitting element 23 acts via the first end on a lever mechanism 25 of the first front-attachment section 11. Each lever mechanism 25 of the front attachment 10 comprises multiple control arms 26, 27 and 28, which are connected to one another in an articulated manner. A first control arm 26 is mounted via a first end to a first region of the first front-attachment section 11 in an articulated manner. A second control arm 27 acts via a first end on a second region of the first front-attachment section 11 in an articulated manner, preferably on the respective pivot axis 15a, 15b formed between the first front-attachment section 11 and the respective inner second front-attachment section 12a, 12b. A third control arm 28 is positioned between the first control arm 26 and the second control arm 27, which third control arm acts via a first end on the second end of the first control arm 26 and via a second end on a second end of the second control arm 27 in an articulated manner. The respective tractive-force element 23 acts in an articulated manner via its first end on the second end of the second control arm 27 and, therefore, on the second end of the third control arm 28 of the respective lever mechanism 25.

The forced coupling between the respective central second front-attachment section 13a, 13b and the respective inner second front-attachment section 12a, 12b of the front attachment 10 is designed in such a way that the respective central front-attachment section 13a, 13b can move through the entire pivot range via the forced coupling and, in fact, without an additional hydraulic cylinder. This forced coupling between the respective central second front-attachment section 13a, 13b and the respective inner second front-attachment section 12a, 12b of the front attachment 10 actually takes place only in sections. Proceeding from the working position of the front attachment 10, the particular inner second front-attachment section 12a, 12b is displaced through a first angular section of approximately 90°, wherein the respective central second front-attachment section 13a, 13b has already been displaced by 180° and rests against a stop of the respective inner second front-attachment section 12a, 12b. The respective central second front-attachment section 13a, 13b then remains against this stop during the further displacement of the respective inner second front-attachment section 12a, 12b.

Opposing pivot movements are carried out in the pivot axes 15a and 16a as well as 15b and 16b. Opposing pivot movements are likewise carried out in pivot axes 16a and 17a as well as 16b and 17b. The pivot movements in the pivot axes 15a and 17a as well as 15b and 17b take place in the same direction.

It is noted at this point that the above-described embodiment of the implement 10 comprising the first implement section 11 and the three second implement sections 12a, 13a, 14a and 12b, 13b, 14b disposed on both sides thereof, as well as the displacement of the implement sections with respect to one another via the displacement devices 21, 22 and the tractive force-transmitting elements 23 and the lever mechanisms 25 is preferred but is not absolutely necessary for the invention. Instead, the invention can also be used with agricultural implements which have a different number of implement sections, and with implements having implement sections that are displaceable relative to one another in a different manner.

According to the invention, a hat-like conveying element 30 made from an elastically deformable material is positioned on at least one of the mowing mechanisms 19 and/or on at least one of the conveying mechanisms 20 of at least one implement section 11, 12a, 12b, 13a, 13b, 14a, 14b. In the exemplary embodiment from FIG. 2, such a hat-like conveying element 30 is positioned on the mowing mechanism 19 of the respective outer second implement section 14a, 14b. In the exemplary embodiment from FIGS. 3 and 4, such a hat-like conveying element 30 is disposed on a conveying mechanism 20 of the respective central second implement section 13a, 13b.

The hat-like conveying elements 30 are formed from an elastically deformable material, preferably from an elastomeric material such as a rubber-like material or from rubber.

Figure 4:
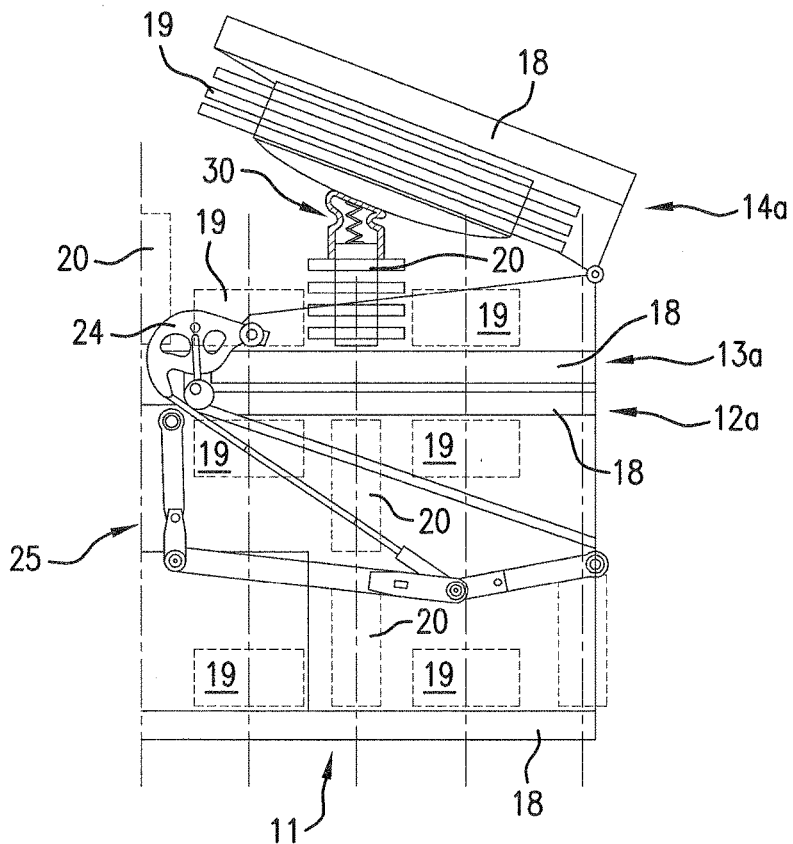
FIG. 4 depicts the front attachment from FIG. 3 in a completely folded-out state.

As can be seen in FIGS. 2 and 4, the respective hat-like conveying element is elastically deformed in a transport position of the implement, wherein, in the working position of the implement 10, the hat-like conveying element automatically returns to its original shape and, therefore, working shape.

The hat-like conveying elements lengthen the overall height of the respective mowing mechanism 19 or conveying mechanism 20 in the vertical direction such that, in the working position of the implement 10, crop which is intended to be cut or which has been cut can be better transported and, therefore, conveyed within the implement 10. Given that the respective hat-like conveying element 30 deforms in the transport position, the dimension of the implement in the transport position is not enlarged by the hat-like conveying elements 30, and so a compact dimension of the implement in the transport position thereof still can be ensured.

Figure 5:
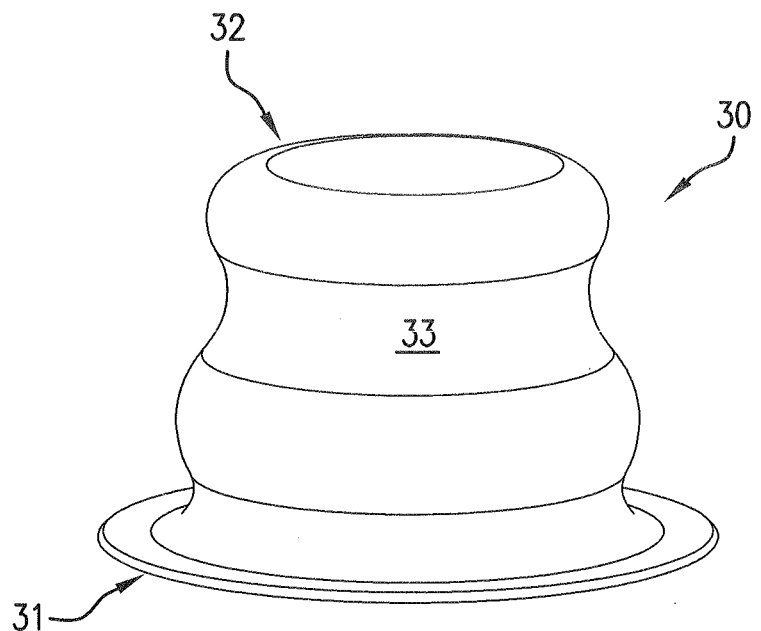
FIG. 5 presents a perspective view of a hat-like conveying element of an agricultural implement of the invention, designed as a front attachment of an agricultural harvester.
Figure 6:
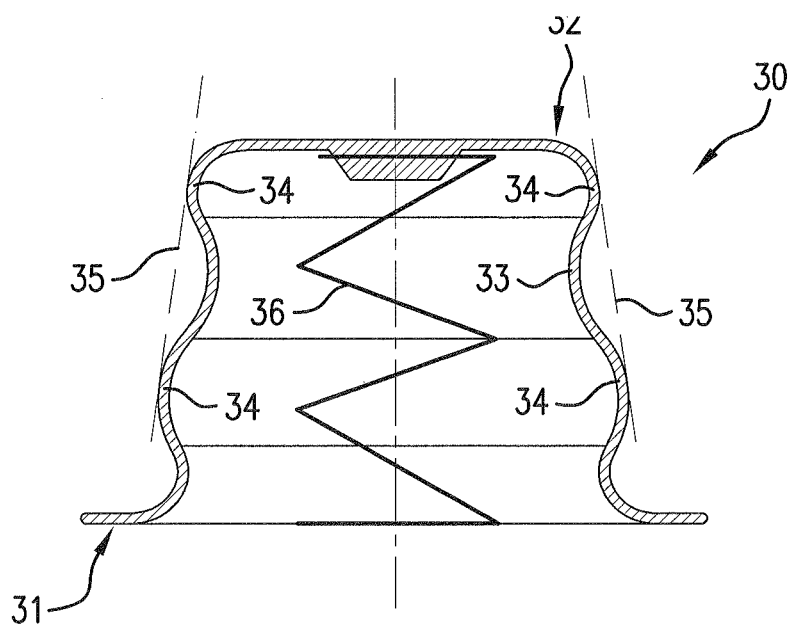
FIG. 6 presents a cross-section of the hat-like conveying element from FIG. 5.

FIGS. 5 and 6 show a hat-like conveying element 30 in greater detail. Each respective hat-like conveying element 30 has a hat brim-like section 31 and a hat crown-like section 32.

The respective conveying element 30 bears via its hat brim-like section 31 against the respective mowing mechanism 19 or the respective conveying mechanism 20. The hat crown-like section 32 protrudes upwardly, wherein the hat crown-like section 32 of the respective hat-like conveying element 30 is designed in the manner of a bellows. A side wall 33 of the hat crown-like section 32 of the respective hat-like conveying element 30, which extends in the circumferential direction or extends peripherally around in the circumferential direction, has a cross-section having a wavy contour.

In the exemplary embodiment shown, cusp tips 34 are formed on the wavy contour of the side wall 33 extending peripherally around in the circumferential direction, wherein the straight lines 35, which extend through the cusp tips 34 of the selected contour of the peripherally extending side wall 33, converge in the direction toward an end of the hat crown-like section 32 facing away from the hat brim-like section 31. As a result, the hat-like conveying elements 30 are particularly advantageously elastically deformable and automatically restorable from the deformed shape into their original shape.

Restoring means, such as springs 36, for example, can be assigned to the conveying element 30, which restoring means supports the restoration into the original shape or applies the restoring force nearly entirely on its own. It can therefore be advantageously ensured that a conveying element 30 is returned to the full upright position when the implement 10 is brought into the working position. A coil spring, for example, which is disposed in an inner hollow space of the conveying element 30, can be provided as the restoring means.

LIST OF REFERENCE NUMBERS 10 implement/front attachment
11 implement section/front attachment section
12a implement section/front attachment section
12b implement section/front attachment section 13a implement section/front attachment section
13b implement section/front attachment section
14a implement section/front attachment section
14b implement section/front attachment section
15a pivot axis
15b pivot axis
16a pivot axis
16b pivot axis
17a pivot axis
17b pivot axis
18 support element
19 mowing mechanism
20 conveying mechanism
21 displacement device
22 displacement device
23 tractive force-transmitting element
24 guide element
25 lever mechanism
26 control arm
27 control arm
28 control arm
29 eccentric
30 hat-like conveying element
31 hat brim-like section
32 hat crown-like section
33 side wall
34 cusp tip
35 straight line
36 spring As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural implement, comprising:
a first central implement section having respective opposing first and second sides;
at least one second implement section positioned on each of the first and second sides of the first implement section;
wherein adjacent implement sections are displaceable relative to one another about a pivot axis, in order to displace the implement between a transport position and a working position;
wherein each implement section comprises mowing mechanisms, conveying mechanisms or both; and
wherein a hat-like conveying element made from an elastically deformable material is positioned on at least one of the mowing mechanisms, on at least one of the conveying mechanisms or both, to lengthen a height of the respective mowing mechanism, conveying mechanism or both when in use.

2. The agricultural implement according to claim 1, wherein the hat-like conveying element is elastically deformable in the transport position of the implement and automatically returns to its original shape in the working position of the implement.

3. The agricultural implement according to claim 1, wherein the hat-like conveying element is made from an elastomeric material.

4. The agricultural implement according to claim 1, wherein the hat-like conveying element is made from a rubber-like material or from rubber.

5. The agricultural implement according to claim 1, wherein the hat-like conveying element has a hat brim-like section and a hat crown-like section.

6. The agricultural implement according to claim 5, wherein the hat-like conveying element bears via the hat brim-like section on one of the respective mowing mechanisms or on one of the respective conveying mechanisms or both.

7. The agricultural implement according to claim 5, wherein the hat crown-like section of the respective conveying element is designed in the manner of a bellows.

8. The agricultural implement according to claim 5, wherein a cross-section of a side wall of the hat crown-like section, which side wall extends peripherally around in the circumferential direction, is defined by a wavy contour.

9. The agricultural implement according to claim 8, wherein virtual straight lines, which extend through cusp tips of the wavy contour, converge in the direction toward an end of the hat crown-like section facing away from the hat brim-like section.

10. The agricultural implement according to claim 1, wherein the hat-like conveying element includes at least one restoring means, which supports restoration of the hat-like conveying element into its original shape or applies a restoring force nearly entirely on its own.

11. A hat-like conveying element for an agricultural implement with an implement section, wherein the hat-like conveying element is configured for positioning on a mowing mechanism or on a conveying mechanism of the implement section and is formed from an elastically deformable material, and lengthens a height of the respective mowing mechanism, conveying mechanism or both when in use.

12. The hat-like conveying element according to claim 11, wherein the elastically deformable material is elastically deformed in a transport position of the implement and automatically returns to an original shape in a working position of the implement.

13. The hat-like conveying element according to claim 11, wherein the elastically deformable material is an elastomeric material.

14. The hat-like conveying element according to claim 11, wherein the elastically deformable material is a rubber-like material or rubber.

15. The hat-like conveying element according to claim 11, comprising a hat brim-like section and a hat crown-like section.

16. The hat-like conveying element according to claim 15, wherein the hat brim-like section bears on the mowing mechanism, the conveying mechanism or both.

17. The hat-like conveying element according to claim 15, wherein the hat crown-like section is designed in the manner of a bellows.

18. The hat-like conveying element according to claim 15, wherein a cross-section of a side wall of the hat crown-like section, which side wall extends peripherally around in the circumferential direction, is defined by a wavy contour.

19. The hat-like conveying element according to claim 18, wherein virtual straight lines, which extend through cusp tips of the wavy contour, converge in the direction toward an end of the hat crown-like section facing away from the hat brim-like section.

20. The hat-like conveying element according to claim 11, comprising at least one restoring means that supports restoration of the hat-like conveying element into its original shape or applies a restoring force nearly entirely on its own.

* * * * *